United States Patent
Eriksson et al.

(10) Patent No.: US 10,298,712 B2
(45) Date of Patent: May 21, 2019

(54) PROXY INTERCEPTION

(71) Applicant: Telefonaktiebolaget LM Ericsson (publ), Stockholm (SE)

(72) Inventors: Anders E Eriksson, Kista (SE); Marcus Ihlar, Uppsala (SE); Adeel Mohammad Malik, Kista (SE); Börje Ohlman, Bromma (SE); Karl-Åke Persson, Järfälla (SE); Linus Sunde, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 15/103,851

(22) PCT Filed: Feb. 20, 2014

(86) PCT No.: PCT/SE2014/050210
§ 371 (c)(1),
(2) Date: Jun. 10, 2016

(87) PCT Pub. No.: WO2015/088416
PCT Pub. Date: Jun. 18, 2015

(65) Prior Publication Data
US 2016/0337464 A1 Nov. 17, 2016

Related U.S. Application Data

(60) Provisional application No. 61/914,692, filed on Dec. 11, 2013.

(51) Int. Cl.
*H04L 29/08* (2006.01)
*H04L 29/06* (2006.01)
(Continued)

(52) U.S. Cl.
CPC ...... *H04L 67/2809* (2013.01); *H04L 67/2842* (2013.01); *H04L 67/327* (2013.01);
(Continued)

(58) Field of Classification Search
None
See application file for complete search history.

(56) References Cited

U.S. PATENT DOCUMENTS

| 10,025,599 B1 * | 7/2018 | Goodson | G06F 9/4411 |
| 2002/0026643 A1 * | 2/2002 | Ewen | H04B 7/18582 |
| | | | 725/109 |

(Continued)

FOREIGN PATENT DOCUMENTS

| CN | 101060417 A | 10/2007 |
| CN | 101350833 A | 1/2009 |
| CN | 102608270 A | 7/2012 |

OTHER PUBLICATIONS

Balachander Krishnamurthy et al., "Web Protocols and Practice, HTTP/1.1, Networking Protocols, Caching, and Traffic Measurement," 2001, 669 pages, Addison Wesley.

(Continued)

*Primary Examiner* — Christopher T Wyllie
(74) *Attorney, Agent, or Firm* — NDWE LLP

(57) ABSTRACT

A client node, a proxy node, and methods therein, as well as a protocol and a computer program for enabling interception of request messages in connection-less protocols. A primary request addressed to a server node is intercepted by a proxy node creating a secondary request based on said request and forwards this secondary request towards the server node. The proxy node receives a secondary response, being a response to the secondary request, creates a primary response based on the secondary response and forwards this primary response to the node from which the primary (Continued)

request was received. A response can thus be sent along the same path as a corresponding request was sent.

18 Claims, 10 Drawing Sheets

(51) Int. Cl.
  *H04L 12/725* (2013.01)
  *H04L 29/12* (2006.01)
(52) U.S. Cl.
  CPC ............ *H04L 67/42* (2013.01); *H04L 45/306* (2013.01); *H04L 61/6013* (2013.01)

(56) References Cited

U.S. PATENT DOCUMENTS

| | | | | |
|---|---|---|---|---|
| 2002/0038309 | A1* | 3/2002 | Perkins | H04L 29/06 |
| 2002/0067359 | A1* | 6/2002 | Brodsky | A61B 8/546 |
| | | | | 345/440 |
| 2002/0152307 | A1* | 10/2002 | Doyle | G06F 9/505 |
| | | | | 709/225 |
| 2004/0017807 | A1* | 1/2004 | Dorr | H04L 49/254 |
| | | | | 370/389 |
| 2004/0162949 | A1* | 8/2004 | Scott | G06F 12/0813 |
| | | | | 711/141 |
| 2004/0249974 | A1* | 12/2004 | Alkhatib | H04L 29/12349 |
| | | | | 709/245 |
| 2005/0002406 | A1* | 1/2005 | Miyata | H04L 29/1233 |
| | | | | 370/401 |
| 2005/0038898 | A1* | 2/2005 | Mittig | H04L 29/06 |
| | | | | 709/230 |
| 2006/0029015 | A1* | 2/2006 | Hinsey | H04L 63/0853 |
| | | | | 370/328 |
| 2006/0136599 | A1 | 6/2006 | Tung | |
| 2006/0253900 | A1* | 11/2006 | Paddon | H04L 41/0803 |
| | | | | 726/11 |
| 2007/0206497 | A1* | 9/2007 | Plamondon | H04L 1/1887 |
| | | | | 370/231 |
| 2008/0005356 | A1* | 1/2008 | Katz | G06F 13/387 |
| | | | | 709/246 |
| 2008/0224903 | A1* | 9/2008 | Samuels | H03M 7/3084 |
| | | | | 341/51 |
| 2008/0281908 | A1* | 11/2008 | McCanne | G06F 17/30156 |
| | | | | 709/203 |
| 2008/0320151 | A1* | 12/2008 | McCanne | H03M 7/30 |
| | | | | 709/228 |
| 2009/0024750 | A1* | 1/2009 | Overby, Jr. | H04L 29/12509 |
| | | | | 709/229 |
| 2009/0288104 | A1* | 11/2009 | Bagepalli | H04L 63/10 |
| | | | | 719/328 |
| 2012/0218999 | A1* | 8/2012 | McDonald | H04L 43/026 |
| | | | | 370/392 |
| 2012/0257628 | A1* | 10/2012 | Bu | H04L 61/2514 |
| | | | | 370/392 |
| 2016/0337464 | A1* | 11/2016 | Eriksson | H04L 67/2842 |

OTHER PUBLICATIONS

Communication under Rule 71(3) EPC for European Application No. 14711621.4, dated Mar. 31, 2017, 90 pages.
Decision to grant a European patent pursuant to Article 97(1) EPC for European Application No. 14711621.4, dated Jun. 9, 2017, 2 pages.
First Office Action and Search Report from foreign counterpart Chinese Patent Application No. 201480067013.9, dated Sep. 5, 2018, 13 pages.
International Search Report and Written Opinion, Application No. PCT/SE2014/050210, dated Feb. 25, 2015, 9 pages.
Written Opinion of the International Preliminary Examining Authority, Application No. PCT/SE2014/050210, dated Nov. 5, 2015, 8 pages.
International Preliminary Report on Patentability, Application No. PCT/SE2014/050210, dated Jan. 21, 2016, 19 pages.
Christian Dannewitz et al., "Network of Information (NetInf)—An information-centric networking architecture," Jan. 27, 2013, pp. 721-735, Computer Communications 36, Elsevier B.V.
Van Jacobson et al., "Networking Named Content," Dec. 1-4, 2009, 12 pages, CoNEXT' 09, Rome, Italy, ACM.
Petri Jokela et al., "LIPSIN: Line Speed Publish/Subscribe Inter-Networking," Aug. 17-21, 2009, 12 pages, SIGCOMM' 09, Barcelona, Spain, ACM.
K. Hartke, "Observing Resources in CoAP, draft-ieff-core-observe-11," Oct. 15, 2013, 31 pages, CoRE Working Group, Internet-Draft, IETF Trust and the persons identified as the document authors.

* cited by examiner

| | Routing | Proxy Source Address | Primary target protocol | Issues |
|---|---|---|---|---|
| Non-transparent intercepting (present disclosure) | Legacy IP | Valid | Connectionless (CoAP or NetInf over UDP/IP) | Stored destination address of request message must be updated in client when receiving response |
| Non-transparent | Statically configured neighbours, separate discovery mechanism, or new routing protocol | Valid | Connection-oriented (HTTP over TCP/IP) | Statically configured routing does not scale. A new routing protocol is a migration hurdle and imposes a location-dependent name structure. |
| Semi-transparent | Legacy IP + app layer header | Valid from server side. Spoofed from client side. | Connection-oriented (HTTP over TCP/IP) | Spoofing of source address. Routing aided by app layer. Asymmetric routing of subsequent requests. |
| Transparent | Legacy IP + app layer header + symmetric routes | Spoofed from both sides. | Connection-oriented (HTTP over TCP/IP) | Spoofing of source address. Routing aided by app layer. Asymmetric routing of subsequent requests. |

Comparison of proxy node types

Fig. 13

PROXY INTERCEPTION

CROSS-REFERENCE TO RELATED APPLICATIONS

This application is a National stage of International Application No. PCT/SE2014/050210, filed Feb. 20, 2014, which claims priority to U.S. Application No. 61/914,692, filed Dec. 11, 2013, which are all hereby incorporated by reference.

CROSS-REFERENCE TO RELATED APPLICATIONS

This application is a National stage of International Application No. PCT/SE2014/050210, filed Feb. 20, 2014, which claims priority to U.S. Application No. 61/914,692, filed Dec. 11, 2013, which are all hereby incorporated by reference.

TECHNICAL FIELD

This disclosure relates to proxy interception of request messages. In more particular, it relates to a client network node, a proxy network node and a server network node and methods therein, as well as a protocol for enabling interception of request messages in connection-less protocols.

BACKGROUND

Point-to-multipoint distribution of data in real-time across multiple operator domains in a highly scalable fashion is a challenging problem. Use cases include distribution of live video streaming from one single smart-phone to millions of viewers, and distribution of machine-to-machine real-time data from a single data source to millions of clients.

Point-to-multipoint distribution of real-time data can be implemented in local networks by making use of multicast mechanisms in link layer technologies such as Ethernet. Also, Internet protocol (IP) layer multicast can be in such local networks. However, these technologies cannot be applied in a scalable fashion in a global network. Ethernet scales to local or metro networks, and IP layer multicast does not scale to a global network with millions of multicast trees.

A network proxy is a key type of node in a network for point-to-multipoint distribution of data. To allow for a scalable solution for point-to-multipoint data distribution, the proxies must be able to interoperate in a hierarchical tree of proxy nodes. In today's networks there exist several types of proxies between a client and a server, for example transparent, semi-transparent, and non-transparent proxies.

A transparent proxy is invisible to the client and the server. A transparent proxy sets up separate transmission control protocol (TCP) connections, with the client on the one hand, and with the server on the other hand, and processes the packets transferred between the client and the server. Still, a transparent proxy is invisible to the client and the server in the sense that it does not use its own source address in the TCP/IP connections to the client and the server. Instead, the proxy spoofs the source address of client in the TCP/IP connection with the server, and spoofs the source address of the server in the TCP/IP connection with the client.

A semi-transparent proxy is invisible to the client but visible to the server. Just as the transparent proxy, it sets up separate TCP/IP connections, with the client on the one hand, and with the server on the other hand, and processes the packets transferred between the client and the server. A semi-transparent proxy is invisible to the client in the sense that it does not use its own source address in the TCP/IP connection to the client. Instead, the semi-transparent proxy spoofs the source address of the server in the TCP/IP connection with the client. However, when setting up a TCP/IP connection with the server, the semi-transparent proxy uses its own IP address, and is thus visible to the server.

A non-transparent proxy is addressed explicitly by a client, a server, or a neighbour proxy. For example, a client may be configured with the address of the proxy, or a novel proxy-aware routing protocol may be used to find a path from a client to a server that traverses a set of proxies.

One design rationale for the existing types of proxies is that the TCP/IP stack in a client and a server can be the same with and without one or multiple proxies in the path between the client and the server.

This is accomplished by either hiding the existence of the proxies from the client or the server, for example in a transparent and semi-transparent type of proxy, or making the proxy act as an explicit server to the client, and making the proxy act as an explicit client to the server, in a non-transparent type of proxy. These design choices are associated with the problems described further down below.

Considering emerging solutions to the problem of scalable point-to-multipoint distribution, information centric networking (ICN) provides a service to clients, who can send a request message for a specific data object to an ICN, and the ICN returns the data object in a response message. The request message does not need to include any information about where in the ICN the data object is stored. Request and response messages are processed in dedicated ICN proxy nodes in the network. Such proxy nodes implement functions to support an efficient delivery of requested data objects, such as caching and publish-subscribe functions. These functions provide for an expedient delivery of large data volumes, for example point-to-multipoint distribution of video streams or Internet of things (IoT) data.

Existing ICN solutions, for example content centric networking (CCN), are based on novel information-centric global routing protocols which perform routing of request messages based on the names of the data objects. The introduction of such novel routing protocols on a global scale is a major migration hurdle since this requires years of standardization followed by major investments in new network nodes.

Moreover, to make CCN support globally scalable routing on the names of the data objects, these names must include topological information. This is an unattractive characteristic, since this means that the data object names become location-dependent and must be changed whenever a data object is moved to a new location in the network.

To allow for a migration friendly solution, there is a need to route request messages using legacy routing mechanisms. Moreover, ICN proxy nodes along the routed path of the request message should be able to process the message in an efficient and timely fashion, so that content can be returned with a low latency.

For example, consider a scenario where a client discovers a cached data object by sending request messages along several different paths to maximize the probability that the data object is discovered in any of the caches in the proxy nodes along the different paths.

Using connection-oriented protocols, for instance hypertext transfer protocol (HTTP) over transmission control protocol (TCP)/IP, and currently existing types of proxy nodes which are optimized for such protocols would incur a lot of overhead in terms of TCP connection set-up and tear-down signalling between all the proxy nodes along the different paths.

Instead, this scenario can be handled more efficiently using a connectionless protocol, for instance constrained application protocol (CoAP) or the experimental NetInf protocol over user datagram protocol (UDP)/IP, which incurs less overhead since it does not require TCP connection set-up and tear-down signalling.

In general, existing proxy solutions are optimized for connection-oriented protocols, for example TCP, but perform less than optimal for connectionless protocols, for example CoAP or NetInf over UDP/IP.

More specifically, a drawback of the transparent and semi-transparent proxy approaches is that spoofing of source addresses is not a recommended practice in the global Internet since it can be used in various types of security attacks.

Another drawback of the transparent and semi-transparent proxy approaches is that subsequent request messages for a specific data object may be routed via different proxies, since subsequent request messages can be routed via different paths due to actions of dynamic routing protocols, or due to load sharing mechanisms. This may cause a subscription request from a client to be routed via one proxy, where a subscription state is set up. A subsequent subscription termination request from the same client may be routed via another proxy, erroneously leaving the subscription state active in the first proxy.

A disadvantage of the transparent proxy is that symmetric routing is required between the client and the server to ensure that the same proxy is traversed both for request and response messages. This problem is particularly obvious in case of load sharing between several parallel proxy nodes, resulting in a risk that a request message is routed via one of the proxy nodes, and the response message is routed via another proxy node.

The drawback of existing non-transparent proxy approaches is that proxy addresses must either be statically configured in clients and neighbour proxies, or a novel proxy-aware routing protocol must be deployed, as in for example CCN.

The transparent and semi-transparent types of proxies are invisible to a client or to a neighbour proxy in the sense that the client or the neighbour proxy does not address the proxy explicitly, and does not see the source address of the proxy. This is an undesirable characteristic in a multi-operator scenario where the client, proxies, and server along an end-to-end path are managed by different operators. In such a scenario, traffic flowing across an inter-operator boundary between a client and a proxy, or two proxies, or a proxy and a server, is subject to policy enforcement based on a Service Level Agreement (SLA). For example, if a proxy does not adhere to the SLA, it should be possible to police the traffic from that proxy. Had the source address from the proxy been visible, this would have been facilitated. This is not the case for the transparent and semi-transparent proxies.

Another technique for addressing the problem of a global network for point-to-multipoint distribution of data in real-time is the publish/subscribe Internet routing paradigm (PSIRP)/European Union framework program PURSUIT proposal for publish-subscribe networking. The key weakness with the PSIRP/PURSUIT approach is that it lacks a feasible migration path as it requires a completely new network forwarding infrastructure based on so called Bloom filters.

The present disclosure addresses among others the problem of designing an ICN proxy node that is optimized for connectionless communication.

SUMMARY

It is an object of embodiments of the disclosure to address at least some of the issues outlined above, and this object and others are achieved by a client node, a proxy node, a server node, and methods therein, as well as a protocol for connectionless communication.

According to one aspect, the disclosure provides a method in a proxy node for non-transparent interception, the method comprising:
   receiving from a first node a primary request comprising:
      an address of the first node as a source address, an address of a server node as destination address, and an identifier of the primary request;
   creating a secondary request based on the primary request, the secondary request comprising: an address to the proxy node as a source address, the address of the server node as destination address, and an identifier of the second request;
   sending the secondary request to the server node;
   receiving a secondary response from a second node, said secondary response comprising: an address of the second node as a source address, the address of the proxy node as destination address, and an identifier of the secondary response;
   checking whether the secondary response matches the secondary request;
   when the secondary response matches the secondary request,
      identifying the primary request on which the secondary request is based;
      creating a primary response based on the primary request and the secondary response, said primary response comprising: the address of the proxy node as a source address, the source address of the primary request as destination address of the primary response, and the identifier of primary request; and
      sending to said first node said primary response.

According to another aspect, the disclosure provides a proxy node for a communication network, the proxy node comprising:
   a processor; and
   a memory storing a computer program comprising computer program code which when run in the processor, causes the proxy node to:
      receive from a first node a primary request comprising:
         an address of the first node as a source address, an address of a server node as destination address, and an identifier of the primary request;
      create a secondary request based on the primary request, the secondary request comprising: an address to the proxy node as a source address, the address of the server node as destination address, and an identifier of the second request;
      send the secondary request to the server node;
      receive a secondary response from a second node, said secondary response comprising: an address of the second node as a source address, the address of the proxy node as destination address, and an identifier of the secondary response;
      check whether the secondary response matches the secondary request;

when the secondary response matches the secondary request,
  identify the primary request on which the secondary request is based;
  create a primary response based on the primary request and the secondary response, said primary response comprising: the address of the proxy node as a source address, the source address of the primary request as destination address of the primary response, and the identifier of primary request; and
  send to said first node said primary response.

According to another aspect, the disclosure provides a proxy node for a communication network, the proxy node comprising: a transmitter, a receiver and a processing circuitry that is adapted to:
  receive via the receiver from a first node a primary request comprising: an address of the first node as a source address, an address of a server node as destination address, and an identifier of the primary request;
  create a secondary request based on the primary request, the secondary request comprising: an address to the proxy node as a source address, the address of the server node as destination address, and an identifier of the second request;
  transmit via the transmitter the secondary request to the server node;
  receive via the receiver a secondary response from a second node, said secondary response comprising: an address of the second node as a source address, the address of the proxy node as destination address, and an identifier of the secondary response;
  check whether the secondary response matches the secondary request;
  when the secondary response matches the secondary request, identify the primary request on which the secondary request is based,
  create a primary response based on the primary request and the secondary response, said primary response comprising: the address of the proxy node as a source address, the source address of the primary request as destination address of the primary response, and the identifier of primary request; and
  transmit via the transmitter said primary response to said first node.

According to another aspect, the disclosure provides a proxy node for a communication network, the proxy node comprising:
  receiving means adapted to receive from a first node a primary request comprising: an address of the first node as a source address, an address of a server node as destination address, and an identifier of the primary request;
  creating means adapted to create a secondary request based on the primary request, the secondary request comprising: an address to the proxy node as a source address, the address of the server node as destination address, and an identifier of the second request;
  sending means adapted to send the secondary request to the server node;
  the receiving means further adapted to receive a secondary response from a second node, said secondary response comprising: an address of the second node as a source address, the address of the proxy node as destination address, and an identifier of the secondary response;
  checking means adapted to check whether the secondary response matches the secondary request;
  identifying means adapted to identify the primary request on which the secondary request is based, when the secondary response matches the secondary request,
  the creating means further adapted to create a primary response based on the primary request and the secondary response, said primary response comprising: the address of the proxy node as a source address, the source address of the primary request as destination address of the primary response, and the identifier of primary request; and
  the sending means further adapted to send said primary response to said first node.

According to another aspect, the disclosure provides a method in a client node, the method comprising:
  sending a request comprising an address of the client node as source address, an address of a server node as destination address, and a first identifier of the request; and
  receiving from a proxy node a response comprising an address of the proxy node as a source address, the address of the client node as the destination address, and a second identifier;
  checking whether the response matches the request, by using said first and second identifiers; and
  when the response matches the request, accepting the response as the response to the request.

According to another aspect, the disclosure provides a client node for a communication network, the client node comprising:
  a processor; and
  a memory storing a computer program comprising computer program code which when run in the processor, causes the client node to:
    transmit a request comprising an address of the client node as source address, an address of a server node as destination address, and a first identifier of the request;
    receive from a proxy node a response comprising an address of the proxy node as a source address, the address of the client node as the destination address, and a second identifier;
    check whether the response matches the request, by using said first and second identifiers; and
    when the response matches the request, accept the response as the response to the request.

According to another aspect, the disclosure provides a client node for a communication network, the client node comprising a receiver, a transmitter and a processing circuitry that is adapted to:
  transmit via the transmitter a request comprising an address of the client node as source address, an address of a server node as destination address, and a first identifier of the request;
  receive via the receiver from a proxy node a response comprising an address of the proxy node as a source address, the address of the client node as the destination address, and a second identifier;
  check whether the response matches the request, by using said first and second identifiers; and
  when the response matches the request, accept the response as the response to the request.

According to another aspect, the disclosure provides a client node for a communication network, the client node comprising:

sending means adapted to send a request comprising: an address of the client node as source address, an address of a server node as destination address, and a first identifier of the request;

receiving means adapted to receive from a proxy node a response comprising an address of the proxy node as a source address, the address of the client node as the destination address, and a second identifier;

checking means adapted to check whether the response matches the request, by using said first and second identifiers; and accepting means adapted to accept the response as the response to the request, when the response matches the request.

According to yet another aspect, the disclosure provides a method in a server node, the method comprising:

receiving from a proxy node a request comprising an address of the proxy node as a source address, an address of the server node as destination address, and an identifier of the request; and processing the request thereby obtaining a response corresponding to the request; and sending the response comprising the address of the server as a source address, the source address of the request corresponding to the response as the destination address, and an identifier being the identifier of the request.

According to yet another aspect, the disclosure provides a server node for a communication network, the server node comprising:

a processor; and a memory storing a computer program comprising computer program code which when run in the processor, causes the server node to:

receive a request comprising an address of a proxy node as source address, an address of the server node as destination address, and a first identifier of the request;

process the request to obtain a response corresponding to the request; and send the response comprising the address of the server node as source address, the source address of the request corresponding to the response as destination address, and an identifier being the identifier of the request.

According to yet another aspect, the disclosure provides a server node for a communication network, the server node comprising a transmitter, a receiver and a processing circuitry that is adapted to:

receive via the receiver a request comprising an address of a proxy node as source address, an address of the server node as destination address, and a first identifier of the request;

process the request to obtain a response corresponding to the request; and transmit via the transmitter the response comprising the address of the server node as source address, the source address of the request corresponding to the response as destination address, and an identifier being the identifier of the request.

According to yet another aspect, the disclosure provides a server node for a communication network, the server node comprising:

receiving means adapted to receive a request comprising an address of a proxy node as source address, an address of the server node as destination address, and a first identifier of the request;

processing means adapted to process the request thereby obtaining a response corresponding to the request; and sending means adapted to send the response comprising the address of the server as a source address, the source address of the request corresponding to the response as the destination address, and an identifier being the identifier of the request.

According to still yet another aspect, the disclosure provides a protocol for connectionless communication, the protocol comprising a field in a response, the field being arranged to indicate a network node that is sending a request towards a destination address to accept a response having a source address different from the destination address of the request, as a response to said request.

According to still yet another aspect, the disclosure provides a computer program comprising computer program code which, when applied in a processor of a network node that is sending a request towards a destination address, causes the network node to accept a response having a source address different from the destination address of the request, as a response to said request.

An advantage with embodiments of the present disclosure is that the return path is identical to the forward path between a client node and a server node. This provides an improved security to the client nodes.

BRIEF DESCRIPTION OF THE DRAWINGS

Embodiments will now be described in more detail, and with reference to the accompanying drawings, in which:

FIG. 13 illustrates a table showing a comparison of proxy node types.

DETAILED DESCRIPTION

Figure 1:
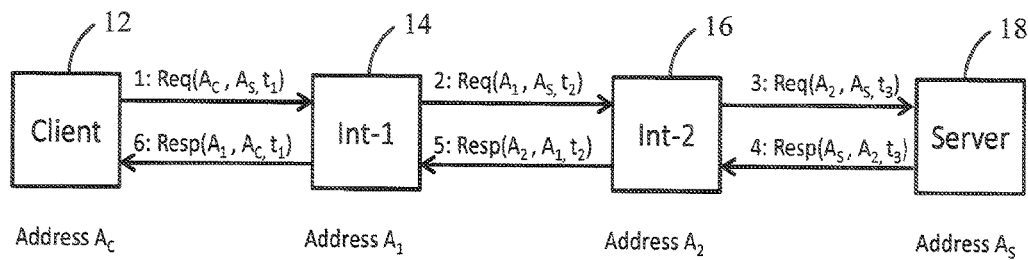
FIG. 1 presents a signalling sequence in a network, according to embodiments of the present disclosure.

In the following description, different embodiments of the disclosure will be described in more detail, with reference to accompanying drawings. For the purpose of explanation and not limitation, specific details are set forth, such as particular examples and techniques in order to provide a thorough understanding.

Embodiments of the present disclosure solve at least some of the problems of the existing proxy networking described above by means of an inventive non-transparent proxy that intercepts a connectionless protocol, for example CoAP or NetInf over UDP/IP.

Embodiments enable communication between client nodes, proxy nodes, and a server node on an end-to-end path between a client node and a server node without having to configure the address of a proxy node in the client node or in any of the neighbour proxy nodes, or without having to deploy a new routing protocol for reaching the proxy nodes. Also, the solution allows for scalability by forming a hierarchical tree of proxy nodes, which aggregates request messages and de-aggregates response messages. This will be described further down.

To retrieve a data object, a client node uses well-known techniques to resolve the name of the data object into a network address of a remote server that stores the data object. The client node then sends a request message across a network to the remote server node. At this stage the client node may not be aware of any intermediate proxies. A legacy routing protocol, for instance an IP routing protocol, routes the request message along a path between the client node and the server node based on the destination address of the server node. Proxy nodes are deployed in the network forming an end-to-end path between the client node and the server node by traversing one or several such proxy nodes.

The proxy nodes use the inventive interception and message processing mechanism as described below to split an end-to-end request-response session between a client node and a server node into a chain of sub-sessions, with one sub-session for each hop along the path between the client node and the server node. The first sub-session is thus between the client node and a first proxy node, the second sub-session is between the first proxy node and a second proxy node, etc., and then the last sub-session is between the last proxy node and the server node. The purpose of splitting an end-to-end session into a chain of sub-sessions is that this allows each proxy node to become a node in a hierarchical caching, request aggregation, or publish-subscribe tree. This will further be described down below.

It should be mentioned that request aggregation and publish-subscribe differ in their way of generating responses to a requesting client. In publish-subscribe an object request from a client can result in any number of responses from a server occurring each time some trigger condition related to the requested object is fulfilled. In request aggregation a request results in only one response instance, which occurs when the requested object becomes available.

Moreover, in request aggregation and publish-subscribe, requests for one and the same object which are received while waiting for a response to the request, are aggregated in the proxy node receiving the requests.

Herein, interception means that a proxy node picks up a request message in transfer which is destined to a remote server node. The intercepting proxy node processes the request message, and then either forwards it towards the remote server node, or returns a response message to the source node of the intercepted request message.

When intercepting a request message, the proxy node replaces the original source address with its own source address, and forwards the request message towards the remote server node. Each proxy node also stores a copy both of the received and the forwarded request message, and a binding between the two. In this fashion, any number of proxy nodes on the path between the client node and the server node can intercept the request message.

When the remote server node receives the request, it returns a response to the source address of the request message, which is the address of the last proxy node that was traversed on the path between the client node and the server node. This proxy node receives the response message from the server node and matches it with the stored request message that it previously sent to the server node. Next, the proxy node uses the binding between this request message and the received request message from the previous proxy node, and then forwards the response to the source address of that request message. Using this mechanism of matching response messages with stored request messages, the response will be forwarded along a path from the server node, via the proxy nodes that were traversed by the request message, back to the client node. This return path will therefore traverse in reverse order the same proxy nodes that the request message traversed on the forward path from the client node to the server node.

Note that with the embodiments of the present disclosure, the forwarding of the response messages along the return path is based on the sub-session state that the proxy nodes set up when forwarding the request message. This is to ensure that the end-to-end return path of the response message traverses the same proxy nodes as the end-to-end forward path of the request message.

Traversing the same proxy nodes in the end-to-end return path of the response messages as the end-to-end forward path of the request messages, supports a publish-subscribe function as well as a request aggregation and caching function, which will be described further down below.

The response messages traversing in the end-to-end return path the same proxy nodes as the end-to-end forward path of the request messages, does not necessarily hold for existing technology based on a transparent proxy node, where a legacy routing protocol, for example an IP routing protocol, is used to route the response message between a server node and a client node, since such a routing protocol may provide different paths in the forward and return directions.

Even though the same proxy nodes would be traversed in the forward and return paths, with existing technology based on a non-transparent proxy node, this involves the effort of configuring the client nodes and the proxy nodes with the addresses of the neighbour proxy nodes, or the effort of deploying a new routing protocol. This effort can be avoided with the present disclosure.

Since routing of request messages as described herein is performed based on legacy routing protocols and node addresses, there is no need to route request messages based on the name of the requested data object. The names of the data objects can therefore be location-independent. This is a clearly advantageous feature, since data objects can retain their names when they change location in the network topology.

Finally, it is noted that the processing of the request and response messages in the proxy nodes may also involve a token. More information about the token, will be presented below.

As noted above, a drawback of the transparent and semi-transparent proxy approaches is that spoofing of source addresses can be used in various types of security attacks. It is therefore not a recommended practice in the global Internet. One way of avoiding such a problem is that the address of a proxy node can be used as an explicit destination address when sending a message to the proxy node, and the proxy node address can also be used as a source address when the proxy node sends a message.

FIG. 1 schematically illustrates a signalling sequence between a client node 12, a proxy node Int-1 14, a proxy node Int-2 16 and server node 18, according to some embodiments of this disclosure. The signalling relates to a novel non-transparent intercepting proxy node for a connectionless protocol, for example NetInf or CoAP over UDP/IP, is illustrated by steps 1 through 6. The signalling is herein described for two intercepting proxy nodes, but it is obvious that this signalling scheme can be extended to cases with an arbitrary number of intercepting proxy nodes.

1. The client node 12 sends a request message towards a server node. The message may have a source address AC, a destination address AS, and an identifier of the request, for example a token number t1. "Req" denotes throughout a request, whereas "Resp" denotes a response. The current request can be denoted Req(AC, AS, t1). The token number is returned as part of a response message and can be used by the client node to match a response with a request. The intercepting proxy node 14, here denoted Int-1, located on the path between the client node 12 and the server node 18 intercepts the request message.

2. The intercepting proxy Int-1 14 forwards the request message towards the server node 18 based on the destination address AS. In the source address field of the request message, it replaces the address AC of the client node 12 with its own address A1. Likewise, it replaces the token number t1 with a token number t2, which can be locally generated. This results in Req(A1, AS, t2). In this way each hop along the path can be provided with a locally unique token number, corresponding to a local request-response relation for each hop of the path. Also, the proxy node 14 can store a copy of the received message as well as the forwarded request message, and a binding between these two messages.

3. A subsequent intercepting proxy node denoted Int-2 16, on the path between the preceding intercepting proxy node Int-1 14 and the server node 18 will intercept the request message as in step 1 and process it in the same fashion as in step 2. Proxy node Int-2 16 eventually forwards the request message to the server node 18 based on the destination address AS, as Req(A2, AS, t3).

4. The server node 18 receives and processes the request message and sends a response message Resp(AS, A2, t3) to the source address of the request message, which is the address of the last intercepting proxy, herein Int-2 16, that was traversed on the path between the client node 12 and the server node 18, i.e. address A2. The intercepting proxy node Int-2 16 receives the response message.

5. The intercepting proxy node Int-2 16 matches the response message with the stored request message that was sent to the server node 18, which may comprise matching the token number t3. The proxy node Int-2 16 may then insert its own address in the source address field of the response message. Using the binding created in step 2, the proxy node Int-2 16 now retrieves the stored request message which was previously received from intercepting proxy node Int-1 14, and may insert the token number t2 from this request message in the response message. The intercepting proxy node Int-2 16 may also store a data object carried in the response message in a cache. The intercepting proxy node Int-2 16 then forwards the response message Resp(A2, A1, t2) to intercepting proxy node Int-1 14, which receives the message.

6. Intercepting proxy node Int-1 14 processes the response message in the same fashion as in step 5 and forwards the response message to the client node 12. The client node 12 receives the response message, matches it with the previously sent request message that comprises the token number t1, and processes the response, Resp(A1, AC, t1).

Aggregation of requests may be performed in any one of the proxy nodes.

If a proxy node receives not only one but also at least a second request for one and the same object before a response has been returned from the server or any upstream proxy node, the first and the at least second requests are aggregated. A response to the requested object is then returned to the requesters after the response has been received from upstream node, i.e. the server node or an upstream proxy node.

The response when received from an upstream node is de-aggregated in the proxy node to be returned to the first and the at least a second requesters.

If a proxy node has cached a requested object or installed a subscription state, for publish-subscribe, a response message will be returned immediately to the requester, either including a copy of the requested cached object, or a confirmation of that a requested subscription is in place.

If the proxy node has aggregated subscription requests, the proxy node will de-aggregate the subscription response after receipt.

It should be mentioned that a request may be request for a subscription, or a GET request for obtaining a data object. In the case of a GET request a proxy node may process the request as a request for aggregation or caching, as will be described down below.

Also, a request may comprise a request to establish a subscription on a data object, or a GET request. A client node may direct such requests to a server node, but the request may be intercepted along a path towards the server node. The server node or a proxy node may send a response to the request by sending an acknowledgement, where the acknowledgement may comprise a link for example a uniform resource location (URL) to a requested data object. According to one embodiment, for instance when using the CoAP protocol, the response may comprise the data object itself. This applies to both the case where the request is a subscription request and to the case where the request is a GET request.

Figure 2:
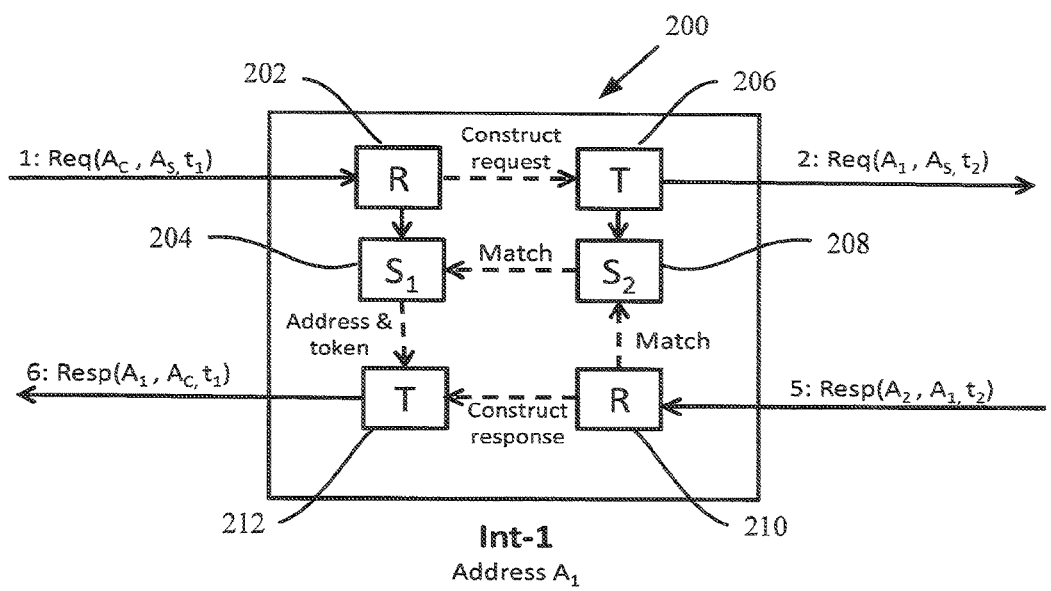
FIG. 2 presents a schematic functional overview of a proxy node according to embodiments of this disclosure.

FIG. 2 presents a schematic functional overview of a proxy node 200 according to some embodiments of this disclosure. The proxy node 200 is adapted to receive a request message Req(Ac, As, t1), wherein the Ac is a source address of the request and As a destination address of the request. Also, t1 denotes an identifier of the request, for example a token number of some kind.

The request Req(AC, AS, t1) can be received by R (Receiver) 202 and stored by S1 (Storage) 204. The request is transformed to a Req(A1, AS, t2), comprising as source address an address of the proxy node 200, as well as a new token number t2. According to one embodiment, this new token number t2 may be created based on the token number t1. The Req (A1, AS, t2) is transmitted towards the server As, and may on its way to the server node traverse one or more proxy nodes. The transmitted request Req(A1, AS, t2) is also stored by S2 (Storage) 208. In 210, the proxy node 200 receives a response Resp(A2, A1, t2*). The proxy node 200 may then determine whether the received response matches the transmitted request. Therefore, it is determined whether the received response matches the transmitted request. In this determination, it can be determined whether token number t2* matches t2, and if the token numbers match, it is determined that the received response matches the request. Knowing that the response corresponds to the transmitted request, the earlier received request is identified based on the determined transmitted request. This may be accomplished via a binding between the received request and the request transmitted by the proxy node. From this identification, the source address of the received request is identified and used as a destination address of a response that is created based on the received response. Moreover, the identifier of the request, token number t1 is identified and used in the response being created in T (transmitter) 212. Subsequently, the created response Resp(A1, AC, t1) is transmitted by T 212 to the source address of the received request, now being the destination address of the response.

Figure 3:
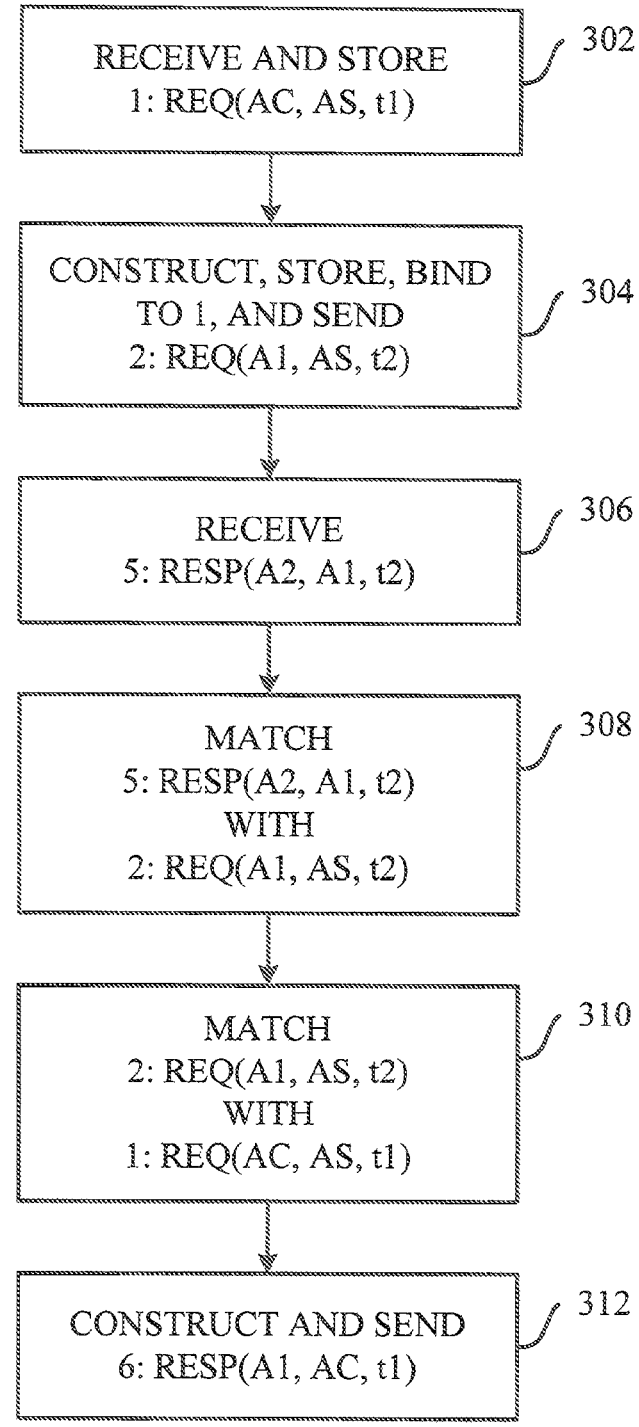
FIG. 3 presents a flow diagram of steps in a proxy node according to embodiments of the disclosure.

FIG. 3 presents a flow-diagram of steps in a proxy node Int-1 as illustrated in FIGS. 1 and 2, according to some embodiments of this disclosure. The nomenclature used herein is the same as used in FIG. 2, for which reason the steps taken herein correspond to and resemble the function of proxy node 200 as schematically presented in FIG. 2.

In 302 a request message Req(AC, AS, t1) is received and stored. In 304, a transformed request message Req(A1, AS, t2) is constructed, stored, bound to Req(AC, AS, t1) and sent towards a server node having address AS.

It is noted that the Req(A1, AS, t2) request message is sent to the server node. This request may or may not however be intercepted by a second proxy node, depending on whether there is such a proxy node on the path to the server node.

Sending a request message to the server node, may therefore in this respect be understood as sending a request message towards the server node, and that another node for instance a proxy node may intercept the request message on the path to the server node.

In 306, a response message Resp(A2, A1, t2*) is received. In 308, it is determined whether the response message Resp(A2, A1, t2*) matches the request message Req(A1, As, t2). If the response message Resp(A2, A1, t2*) matches the request message Req(A1, AS, t2), it is in 310 identified a request message Req(A1, AS, t2) that matches the request message Req(AC, AS t1), from the binding. In 312 a response message Resp(A1, AC, t1) is constructed and transmitted to the source address of the request message as received in 302.

Within embodiments of the present disclosure, client nodes, proxy nodes and the server node are adapted to store the received and sent request messages, which are used as sub-session states for instance in an CoAP observation framework.

These messages include the addresses of the neighbour nodes on the end-to-end path between the client node and the server node. A bilateral relation can thereby be established between each of the neighbour nodes, and subsequent response messages in a session can be sent via these neighbour nodes, which will forward them in a hop-by-hop fashion to the client. Likewise, subsequent request messages in a session from the client can be sent via these neighbour nodes, which will forward them in a hop-by-hop fashion to the server.

If the response message indicates that the requested data object was not found, there is no need for a sub-session and therefore the proxy nodes which are traversed by this response message can tear down the sub-session state. Alternatively, the sub-session state can be torn down using a time-out mechanism.

The signalling sequence in FIG. 1 can start with no sub-session state where the client node and the server node are unaware of the proxy nodes, and the proxy nodes are unaware of its neighbours. After completing an initial request-response signalling sequence, a sub-session state has been set up and the proxy nodes are addressed explicitly by its neighbours for subsequent signalling. This means that each proxy node has assumed the role of a traditional non-transparent proxy for the subsequent signalling in this sub-session.

An idea of embodiments of this disclosure is a signalling mechanism that enables transition from an initial state in which there is no sub-session, and each proxy node acts as an intercepting proxy, to a final sub-session state in which each proxy node acts as a traditional non-transparent proxy. This final connected state allows for a well-defined interaction between the client node, the proxy node, and the server node for purposes comprising caching, request aggregation, and publish-subscribe. This disclosure enables reaching this final state without the need for pre-configuration of neighbour node addresses, or a new routing protocol.

It is common practice that protocol stacks expect the source address of a received response message to be identical with the destination address of the previously sent request message. If this is not the case, the protocol stack just rejects a received response message. In embodiments of the present disclosure, this is indeed not fulfilled for the client node, the proxy node Int-1 and the proxy node Int-2 of FIG. 1, for example.

For this reason an inventive mechanism that instructs the sender of a request message to accept a response message with a source address different from the destination address of the request message, has been developed. This can be handled by introducing a new protocol field in the response message which can instruct the client node or proxy node to accept a response message with a source address that is different from the destination address in the previously sent request message.

The introduction of the new field can be included in a modified version of an existing request-response protocol, for example CoAP, or in an inventive request-response protocol. It should be emphasized that the new protocol field is required only in the request-response protocol, and is thus not required in the protocol used for routing.

A protocol for connectionless communication, the protocol comprising a field in a response, the protocol being arranged to inform a network node that is sending a request towards a destination address to accept a response having a source address different from the destination address of the request, as a response to said request.

The field of the protocol may comprise the address of the server node.

The field of the protocol may explicitly instruct the network node sending a request towards a destination address to accept a response having a source address different from the destination address of the request, as a response to said request.

Moreover, it is also envisaged a computer program comprising computer program code which, when applied in a processor of a network node that is sending a request towards a destination address, causes the network node to accept a response having a source address different from the destination address of the request, as a response to said request.

In addition, a computer program product comprising the computer program as above, and computer readable means on which the computer program is stored, is envisaged by the present disclosure.

The new protocol field may thus include the destination address of the previously sent request message, which will allow the receiver to correlate the response message with the previously sent request message.

This protocol field may also include authentication information associated with the source address. The receiver can then accept a response message using a common condition that its token number and the identity of the requested resource match those of the previously sent request message.

This token matching implies that all subsequent responses or notifications to a given request message may have to include the new protocol field with the destination address of the previously sent request message, since token numbers generated by a requester are typically only unique per destination address.

The new protocol field can be implemented above in the application layer protocol, for example as an extension to the current CoAP or NetInf protocols.

An advantage of this approach is that legacy UDP/IP application programming interface (API) implementations do not need to be updated.

Figure 4A:
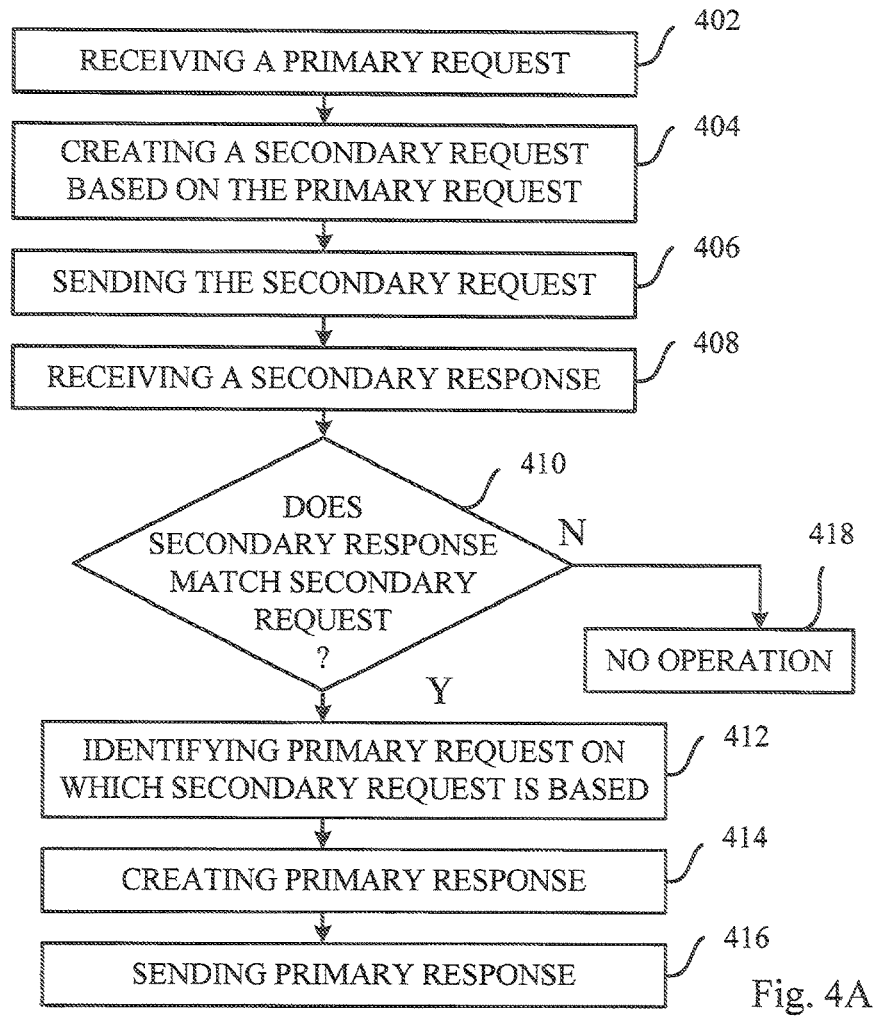
FIGS. 4A and B present flow diagrams of method steps in a proxy node according to embodiments of the disclosure.

FIG. 4A presents a flow diagram of method steps of a proxy node for non-transparent interception, according to embodiments of the present disclosure.

In 402, the method comprises receiving from a first node a primary request comprising: an address of the first node as a source address, an address of a server node as destination address, and an identifier of the primary request. In 404, a secondary request is created based on the primary request, the secondary request comprising: an address to the proxy node as a source address, the address of the server node as destination address, and an identifier of the second request. In 406, the secondary request is sent to a server node. In 408, a secondary response is received from a second node, said secondary response comprising: an address of the second node as a source address, the address of the proxy node as destination address, and an identifier of the secondary response. In 410, it is checked whether the secondary response matches the secondary request. When the secondary response matches the secondary request ("Y" in 410), the method further comprises 412 identifying the primary request on which the secondary request is based. In 414, a primary response is created based on the primary request and the secondary response, said primary response comprising: the address of the proxy node as a source address, the source address of the primary request as destination address of the primary response, and the identifier of primary request. In addition, in 416, the primary response is sent to said first node.

When the secondary response does not match the secondary request ("N" in 410), the method can stop by performing "no operation", in 418.

Receiving 302, 402 from a first node a primary request may comprise intercepting the primary request as sent from the first node.

Receiving 306, 408 the secondary response may comprise a secondary field instructing the proxy node 14, 16, 200, 500, 510, 520 to accept said secondary response having a source address different from the destination address of the secondary request, as a response to the secondary request, and comprise creating 312, 414 the primary response comprising a primary field for instructing the first node to accept said primary response having a source address different from the destination address of the primary request, as a response to the primary request.

The primary and secondary fields within this method may comprise the address of the server node.

Figure 4B:
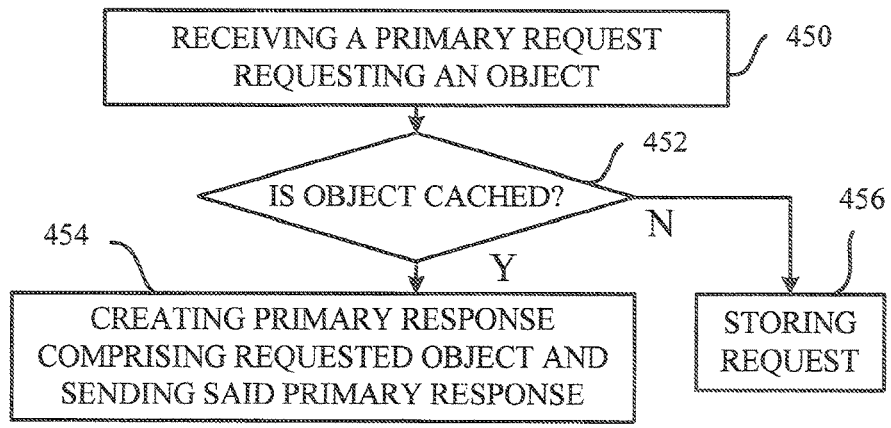

FIG. 4B presents a flow diagram of subsequent method steps of a proxy node for non-transparent interception, according to embodiments of the present disclosure.

In 450, the method comprises receiving from a first node another primary request requesting an object. Said another primary request may of course also comprise an address of a first node as a source address, an address of a server node as destination address, and an identifier of said another primary request. In 452, it is checked whether the requested object is cached in the proxy node. If the requested object is cached on the proxy node ("Y" in 452), this method further comprises 454 creating another primary response comprising the requested object, and sending said another primary response to the first node. However, if the requested object is not cached in the proxy node ("N" in 452), the method comprise storing 456 said request in the proxy node. This stored request can be aggregated with other requests requesting the same object. When the proxy node receives a response comprising the requested object responses can be forwarded to the nodes from which the requests were received.

Receiving 402 the secondary response may thus comprise an object, and when the secondary response matches the secondary request, caching the object in the proxy node as an object requested in the primary request.

The method in a proxy node may thus also subsequently comprise receiving 450 from the first node another primary request requesting an object, checking 452 if the object as requested in said another primary request is cached in the proxy node, and when said object is cached in the proxy node, creating 454 another primary response based on said another primary request, said primary response comprising the said object and sending 454 said another primary response to the first node.

Figure 5A:
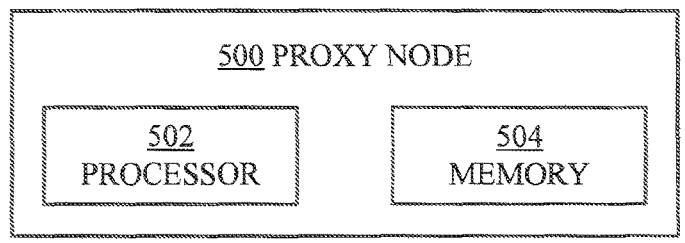
FIGS. 5A-C schematically present a proxy node according to embodiments of the disclosure.

FIG. 5A schematically presents a proxy node 500 for a communication network, the proxy node comprising:
 a processor 502; and
 a memory 504 storing a computer program comprising computer program code which when run in the processor, causes the proxy node to:
  receive 402 from a first node a primary request comprising: an address of the first node as a source address, an address of a server node as destination address ( ), and an identifier of the primary request;
  create 404 a secondary request based on the primary request, the secondary request comprising: an address to the proxy node as a source address, the address of the server node as destination address, and an identifier of the second request;
  send 406 the secondary request to the server node;
  receive 408 a secondary response from a second node, said secondary response comprising: an address of the second node as a source address, the address of the proxy node as destination address, and an identifier of the secondary response;
 check 410 whether the secondary response matches the secondary request;
 when the secondary response matches the secondary request,
  identify 412 the primary request on which the secondary request is based;
  create 414 a primary response based on the primary request and the secondary response, said primary response comprising: the address of the proxy node as a source address, the source address of the primary request as destination address of the primary response, and the identifier of primary request; and
  send 416 to said first node said primary response.

The computer program code which when run in the processor 502 of the proxy node 500, may further cause the proxy node to receive the secondary response comprising an object, and when the secondary response matches the secondary request, to cache the object as an object requested in the primary request.

The computer program code which when run in the processor 502 of the proxy node 500, may further cause the proxy node to subsequently receive 450 from the first node another primary request requesting an object, check 452 if the object as requested in said another primary request is cached in the proxy node, when said object is cached in the proxy node, create 454 another primary response based on said another primary request, said primary response comprising the said object and send 454 said another primary response to the first node.

The computer program code which when run in the processor 502 of the proxy node 500, may further cause the proxy node to intercept the primary request as sent from the first node.

The computer program code which when run in the processor 502 of the proxy node 500, may further cause the proxy node to receive 306, 408 the secondary response comprising a secondary field instructing the proxy node 14, 16, 200, 500, 510, 520 to accept said secondary response having a source address different from the destination address of the secondary request, as a response to the secondary request, and to create 312, 414 the primary response comprising a primary field for instructing the first node to accept said primary response having a source address different from the destination address of the primary request, as a response to the primary request.

The primary and secondary fields may further comprise the address of the server node.

Figure 5B:
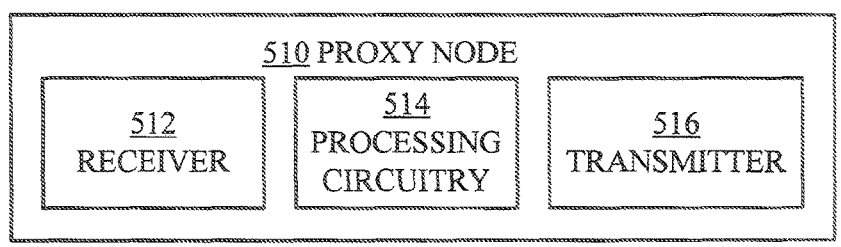

FIG. 5B schematically presents a proxy node for a communication network, the proxy node comprising a receiver 512, a transmitter 516 and a processing circuitry 514 that is adapted to:
  receive 402 via the receiver from a first node a primary request comprising: an address of the first node as a source address, an address of a server node as destination address ( ), and an identifier of the primary request;
  create 404 a secondary request based on the primary request, the secondary request comprising: an address to the proxy node as a source address, the address of the server node as destination address, and an identifier of the second request;
  transmit 406 via the transmitter the secondary request to a second node;
  receive 408 via the receiver a secondary response from the second node, said secondary response comprising: an address of the second node as a source address, the address of the proxy node as destination address, and an identifier of the secondary response;
  check 410 whether the secondary response matches the secondary request;
    identify 412 the primary request on which the secondary request is based, when the secondary response matches the secondary request,
    create 414 a primary response based on the primary request and the secondary response, said primary response comprising: the address of the proxy node as a source address, the source address of the primary request as destination address of the primary response, and the identifier of primary request; and
    transmit 416 via the transmitter said primary response to said first node.

The processing circuitry 514 of the proxy node 510 may comprise a processor and a memory and wherein said memory contains instructions executable by said processor.

Figure 5C:
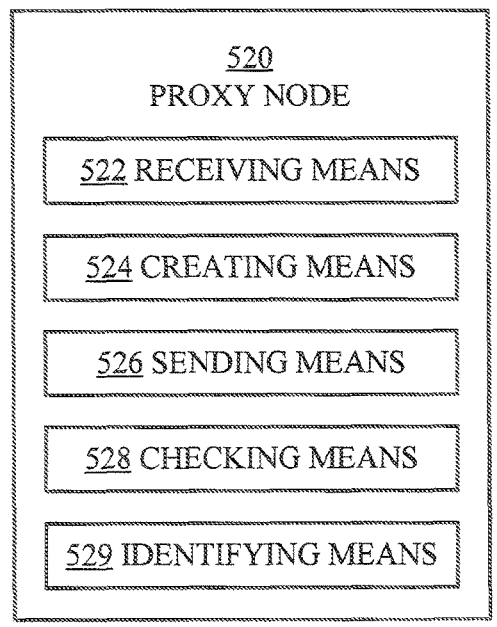

FIG. 5C schematically presents a proxy node 520 for a communication network, the proxy node comprising:
  receiving means 522 adapted to receive 402 from a first node a primary request comprising: an address of the first node as a source address, an address of a server node as destination address, and an identifier of the primary request;
  creating means 524 adapted to create 404 a secondary request based on the primary request, the secondary request comprising: an address to the proxy node as a source address, the address of the server node as destination address, and an identifier of the second request;
  sending means 526 adapted to send 406 the secondary request to the server node;
  the receiving means 522 further adapted to receive 408 a secondary response from a second node, said secondary response comprising: an address of the second node as a source address, the address of the proxy node as destination address, and an identifier of the secondary response;
  checking means 528 adapted to check 410 whether the secondary response matches the secondary request;
  identifying means 529 adapted to identify 412 the primary request on which the secondary request is based, when the secondary response matches the secondary request,
  the creating means 524 further adapted to create 414 a primary response based on the primary request and the secondary response, said primary response comprising: the address of the proxy node as a source address, the source address of the primary request as destination address of the primary response, and the identifier of primary request; and
  the sending means 526 further adapted to send 416 said primary response to said first node.

It is noted that "primary" and "secondary" are used herein solely to distinguish one request or response from another request or response, and does that not imply any hierarchy or priority among the two.

Figure 6:
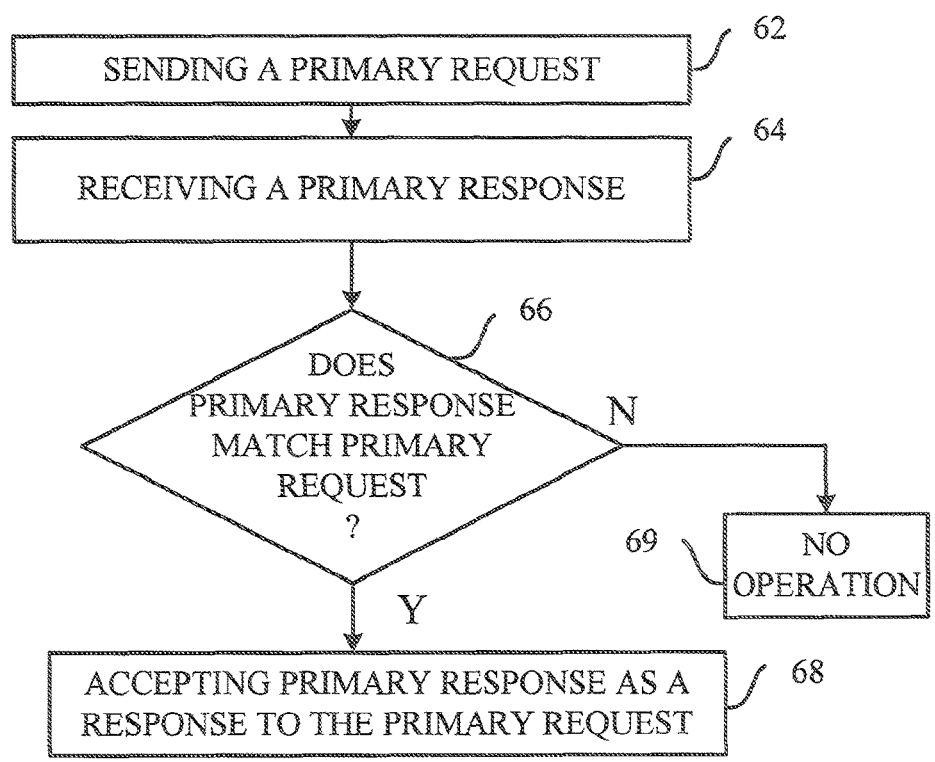
FIG. 6 presents a flow diagram of method steps in a client node according to embodiments of the disclosure.

FIG. 6 presents a flow diagram of method steps of a client connectionless communication, according to embodiments of the present disclosure. In 62, the method comprises sending a request comprising an address of the client node as source address, an address of a server node as destination address, and a first identifier of the request. In 64, the method comprises receiving from a proxy node a response comprising an address of the proxy node as a source address, the address of the client node as the destination address, and a second identifier. In 66, the method comprises checking whether the response matches the request, by using said first and second identifiers. In 68, the method comprises accepting the response as the response to the request, when the response matches the request ("Y" in 66).

When the response does not match the request ("N" in 66), the method stops by performing no operation in 69.

Receiving 64 the response may comprise receiving a field instructing the client node 14, 16, 200, 500, 510, 520 to accept said response having a source address different from the destination address of the request, as a response to the request.

The field as comprises in receiving 64, may comprise the address of the server node.

Figure 7A:
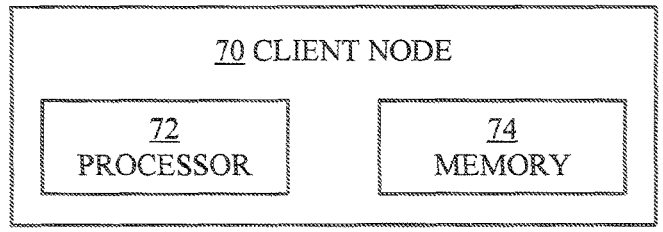
FIGS. 7A-C schematically present a client node according to embodiments of the disclosure.

FIG. 7A schematically presents a client node 70 for a communication network, the client node comprising:
  a processor 72; and a memory 74 storing a computer program comprising computer program code which when run in the processor, causes the client node 70 to:
  transmit 62 a request comprising an address of the client node as source address, an address of a server node as destination address, and a first identifier of the request;
  receive 64 from a proxy node a response comprising an address of the proxy node as a source address, the address of the client node as the destination address, and a second identifier;
  check 66 whether the response matches the request, by using said first and second identifiers; and
  when the response matches the request, accept 68 the response as the response to the request.

The computer program code which when run in the processor 72 of the client node 70, may further cause the client node to receive 64 the response comprising a field instructing the client node 70 to accept said response having a source address different from the destination address of the request, as a response to said request.

The field as comprised in the response received in 64, may comprise the address of the server node.

Figure 7B:
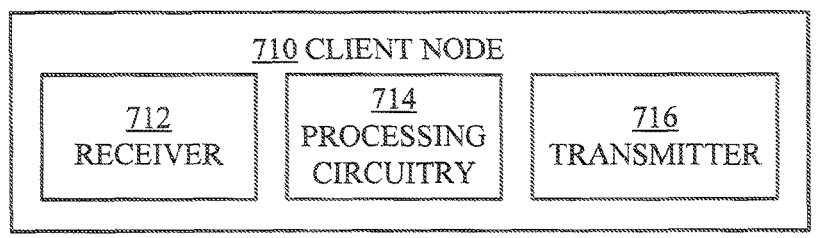

FIG. 7B schematically presents a client node 710 for a communication network. The client node 710 comprises a receiver 712, a processing circuitry 714 and a transmitter 716, where the processing circuitry is adapted to:
  transmit 62 via the transmitter 716 a request comprising an address of the client node as source address, an address of a server node as destination address, and a first identifier of the request;
  receive 64 via the receiver 712 from a proxy node a response comprising an address of the proxy node as a source address, the address of the client node as the destination address, and a second identifier;
  check 66 whether the response matches the request, by using said first and second identifiers; and
  when the response matches the request, accept 68 the response as the response to the request.

The processing circuitry 714 of the client node 110 may comprise a processor and a memory and wherein said memory contains instructions executable by said processor.

Figure 7C:
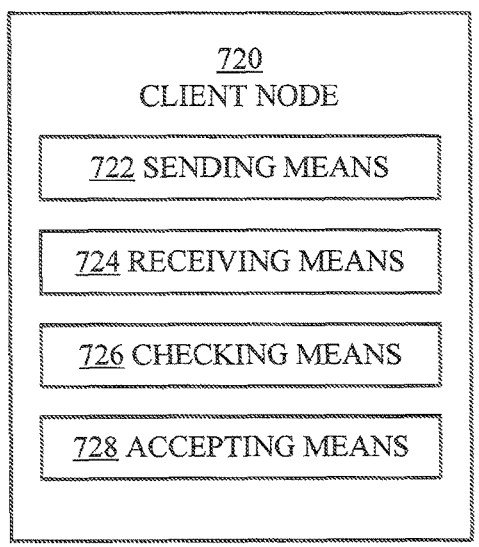

FIG. 7C schematically presents a client node 720 for a communication network. The client node comprises:
  sending means 722 adapted to send 62 a request comprising: an address of the client node as source address, an address of a server node as destination address, and a first identifier of the request;
  receiving means 724 adapted to receive 64 from a proxy node a response comprising an address of the proxy node as a source address, the address of the client node as the destination address, and a second identifier;
  checking means 726 adapted to check 66 whether the response matches the request, by using said first and second identifiers; and
  accepting means 728 adapted to accept 68 the response as the response to the request, when the response matches the request.

Figure 8:
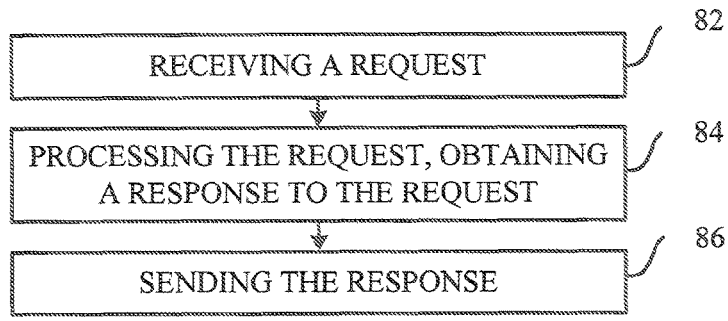
FIG. 8 presents a flow diagram of method steps in a server node according to embodiments of the disclosure.

FIG. 8 presents a flow diagram of method steps of a server node for connectionless communication, according to embodiments of the present disclosure. In 82, the method comprises receiving 82 from a proxy node a request comprising an address of the proxy node as a source address, an address of the server node as destination address, and an identifier of the request. In 84, the method comprises processing the request thereby obtaining a response corresponding to the request. In 86, the method comprises sending the response comprising the address of the server as a source address, the source address of the request corresponding to the response as the destination address, and an identifier being the identifier of the request.

Figure 9A:
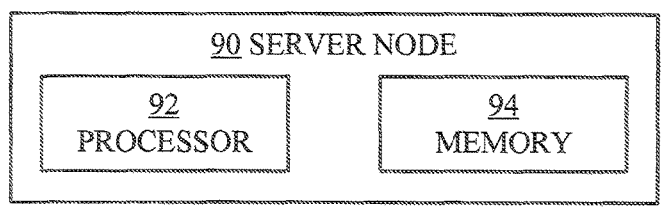
FIGS. 9A-C schematically present a server node according to embodiments of the disclosure.

FIG. 9A schematically presents a server node 90 for a communication network, the server node comprising:
  a processor 92; and
  a memory 94 storing a computer program comprising computer program code which when run in the processor 92, causes the server node 90 to:
    receive 82 a request comprising an address of a proxy node as source address, an address of the server node as destination address, and a first identifier of the request;
    process 84 the request to obtain a response corresponding to the request; and
    send 86 the response comprising the address of the server node as source address, the source address of the request corresponding to the response as destination address, and an identifier being the identifier of the request.

Figure 9B:
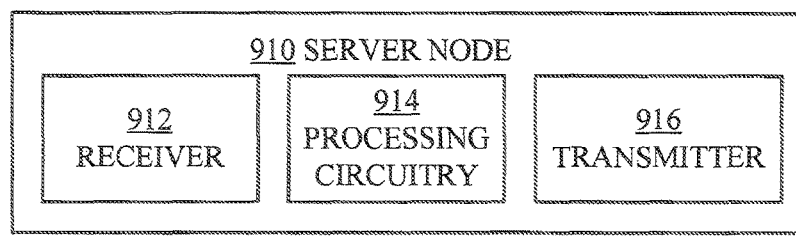

FIG. 9B schematically presents a server node 910 for a communication network. Server node 910 comprises a receiver 912, processing circuitry 914 and a transmitter 916, where the processing circuitry 914 is adapted to:
  receive 82 via the receiver 912 a request comprising an address of a proxy node as source address, an address of the server node as destination address, and a first identifier of the request;
  process 84 the request to obtain a response corresponding to the request; and
  transmit 86 via the transmitter 916 the response comprising the address of the server node as source address, the source address of the request corresponding to the response as destination address, and an identifier being the identifier of the request.

The processing circuitry 914 of the server node 910 may comprise a processor and a memory and wherein said memory contains instructions executable by said processor.

Figure 9C:
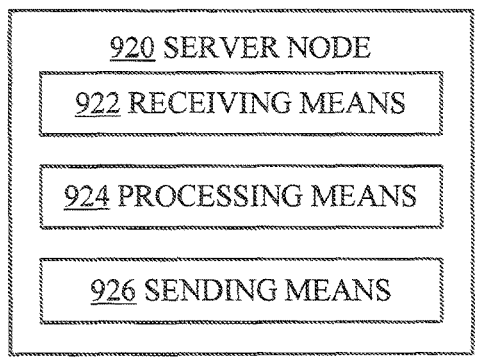

FIG. 9C schematically presents a server node 920 for a communication network, the server node 920 comprising:
  receiving means 922 adapted to receive 82 a request comprising an address of a proxy node as source address, an address of the server node as destination address, and a first identifier of the request;
  processing means 924 adapted to process 84 the request thereby obtaining a response corresponding to the request; and
  sending means 926 adapted to send 86 the response comprising the address of the server as a source address, the source address of the request corresponding to the response as the destination address, and an identifier being the identifier of the request.

The purpose of splitting an end-to-end session into a chain of sub-sessions as described above is that this allows each proxy node to become a node in a hierarchical publish-subscribe, request aggregation, or caching tree. Down below a few applications of an interception mechanism in a hierarchical network of publish-subscribe, request aggregation, or caching nodes, will be exemplified.

An inventive non-transparent intercepting proxy offers advantages compared to traditional types of proxy nodes as indicated previously in the background section. This is especially pronounced when being applied to use cases as described down below.

It is currently known that when a server publishes a type of data object that can be subscribed to, clients can subscribe to notifications that the server sends whenever the data object is updated, for example using the CoAP protocol. If the number of subscriptions is substantial, the server may not have sufficient capacity to handle all of them.

As herein disclosed herein, a proxy node can aggregate subscription messages from client nodes or other proxy nodes, and only forward one subscription message towards the server node. Likewise, when the server node returns a notification, the proxy node receives this notification, and de-aggregates it by sending a copy of the notification to all subscribing clients.

Figure 10:
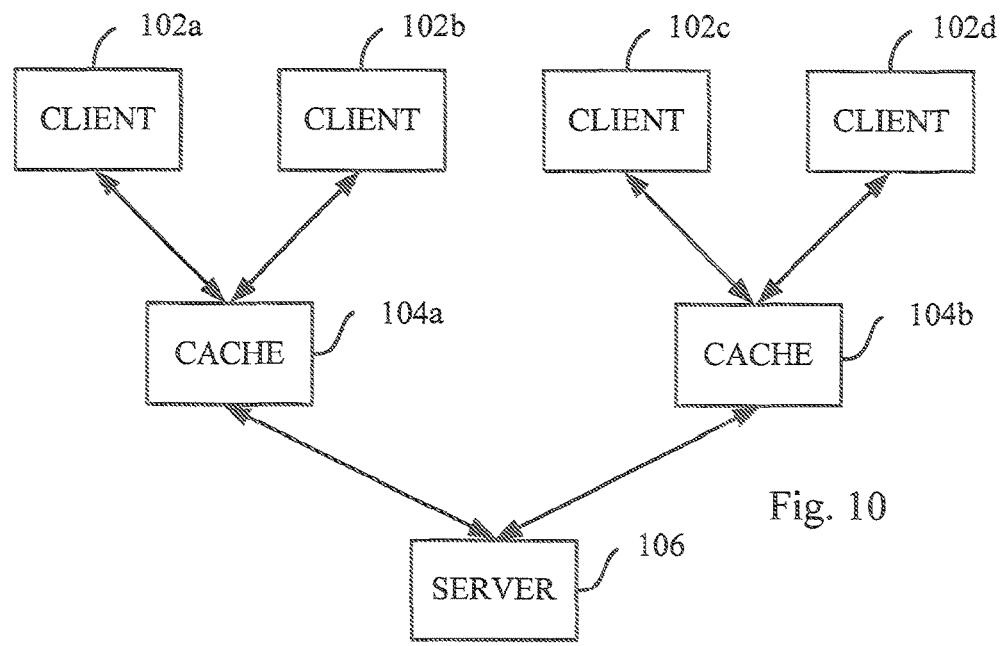
FIGS. 10 and 11 illustrate hierarchical applications related to embodiments of the present disclosure.
Figure 11:
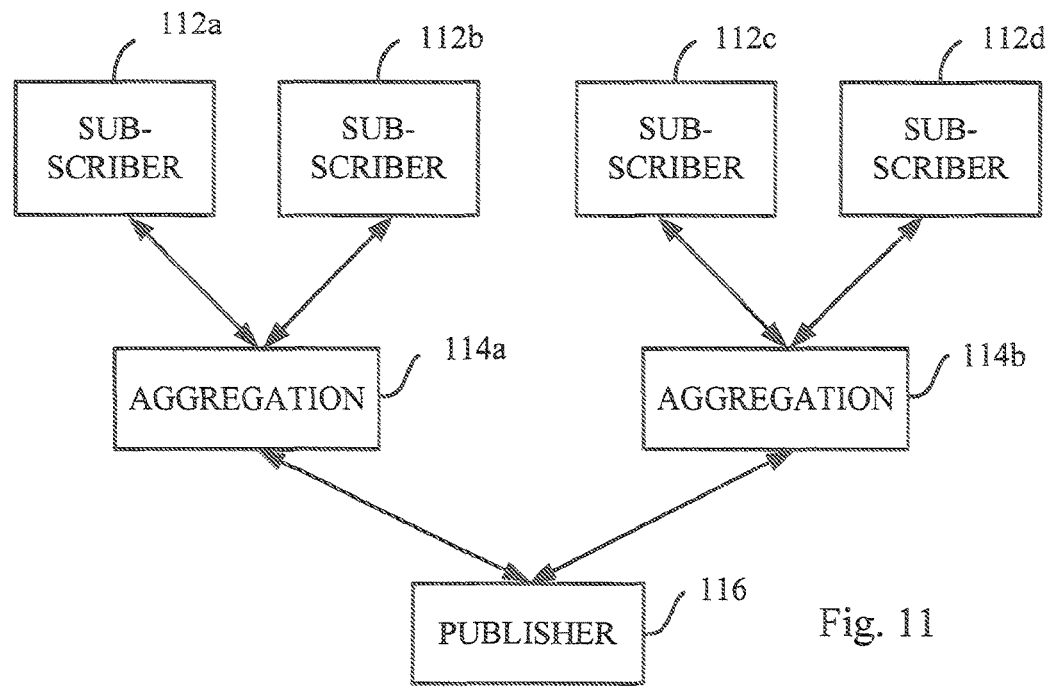

FIGS. 10 and 11 illustrate a hierarchical network applied to request aggregation and publish-subscribe with proxy nodes, respectively, according to embodiments of the present disclosure.

FIG. 10 presents client nodes 102a-d, caching proxy nodes 104a,b and a server node 106.

Requests can be aggregated in the proxy nodes 104a,b and in the server node 106. Likewise, responses can be de-aggregated in the same server node 106 and the proxy nodes 104a,b.

FIG. 11 depicts subscribers 112a-d, aggregating proxy nodes 114a,b and a publishing server 116. By aggregating subscription requests and de-aggregating notifications, the proxy nodes 114a,b can construct a scalable global publish-subscribe mechanism.

The subscription aggregation and de-aggregation mechanism can make use of the inventive interception mechanism described above. When a proxy node 114a,b intercepts a subscription request for a specific data object, it can set up a subscription state for that data object with a binding to the subscriber, and then forward the subscription request to the publisher 116, corresponding to a server node. By forwarding the request, the proxy node 114a,b subscribes to the data object as a proxy for the subscriber. Subsequently, when the proxy node 114a,b receives another subscription request for the same data object, it sets up a binding to the subscriber 112a-d, but without having to forward the subscription request, because the proxy node 114a,b is already subscribing to the data object. The proxy node can thereby aggregate subscriptions from any number of subscribers 112a-d. Likewise, when a publisher 116 sends a notification for a data object to a proxy subscribing to that data object, the proxy node 114a,b can de-aggregate this notification by sending it to all subscribers 112a-d that have subscribed to the data object. Aggregation of subscription request signals and de-aggregation of notification response signals will subsequently be described in relation to FIG. 12.

Using the inventive interception mechanism for connectionless protocols, for instance CoAP or NetInf over UDP/IP, which forms sub-sessions for each hop along the path between a publisher and a subscriber, this aggregation and de-aggregation mechanism, can readily be extended to a tree with an arbitrary number of hierarchical aggregation and de-aggregation levels.

Now, reference is made to FIG. 10. A related mechanism, the request aggregation mechanism, works in the same way as the publish-subscribe mechanism in the sense that requests for a specific data object are aggregated in proxy nodes 104a,b in a hierarchical tree topology, and responses are de-aggregated in the same nodes. However, with request aggregation, only one response is returned on a request, whereas a subscription request can result in multiple responses or notifications. The interception mechanism described in the present disclosure works in the same fashion for the request aggregation case, mentioned here, as for a publish-subscribe case as mentioned above.

The proxy nodes 104a,b cache the data objects that the server node 106 returns in response messages. When a proxy node 104a,b intercepts a message which requests a specific data object, it first checks whether it has cached a copy of that data object.

If the proxy node has cached that data object, the proxy node 104a,b returns the data object in a response message to the source address of the request message.

If the first proxy node 104a,b has not cached the data object, for example that the proxy node does not find the requested data object in its cache, it replaces the source address in the request by including the address of the proxy node as the source address of the request message to be forwarded, and forwards the request message towards the server node 106. The request message can then be intercepted by the next proxy on the path towards the server node, which processes the request message in the same fashion as the first proxy.

If the requested data object is not found in any of the proxy caches of the proxy nodes to the server node, the request message will reach the server node 106, which will return the requested data object in a response message, which will follow the return path via the proxy nodes as described above. Based on this combination of the inventive interception mechanism with traditional caching mechanisms, the proxy nodes 104a,b can form a hierarchical caching tree in a fashion similar to the hierarchical publish-subscribe tree described above, see FIG. 12.

When de-aggregating notification messages, the data objects carried in the notification messages can be cached in the same fashion as when the data objects in regular responses are cached as described above. This means that the publish-subscribe mechanism can readily be integrated with the caching mechanism.

The signalling sequence as was schematically illustrated in FIG. 1, applies to a scenario where data can be delivered directly in a response message. Since CoAP or NetInf over UDP/IP is connectionless, CoAP messages can be sent as shown in FIG. 1 without any need for initial set-up of connections in the style of TCP/IP. Response messages can be sent directly in the case for small data volumes, which can be transferred in a single small packet without any need for congestion control. The request and response messages can then be carried over connection-less protocols, such as CoAP over UDP/IP. However, for larger data volumes, a connection-oriented approach such as HTTP over TCP/IP should be used to allow for congestion control and reliable data transfer.

The connection-less signalling as described above may be complemented with connection-oriented signalling, for example HTTP over TCP/IP.

Figure 12:
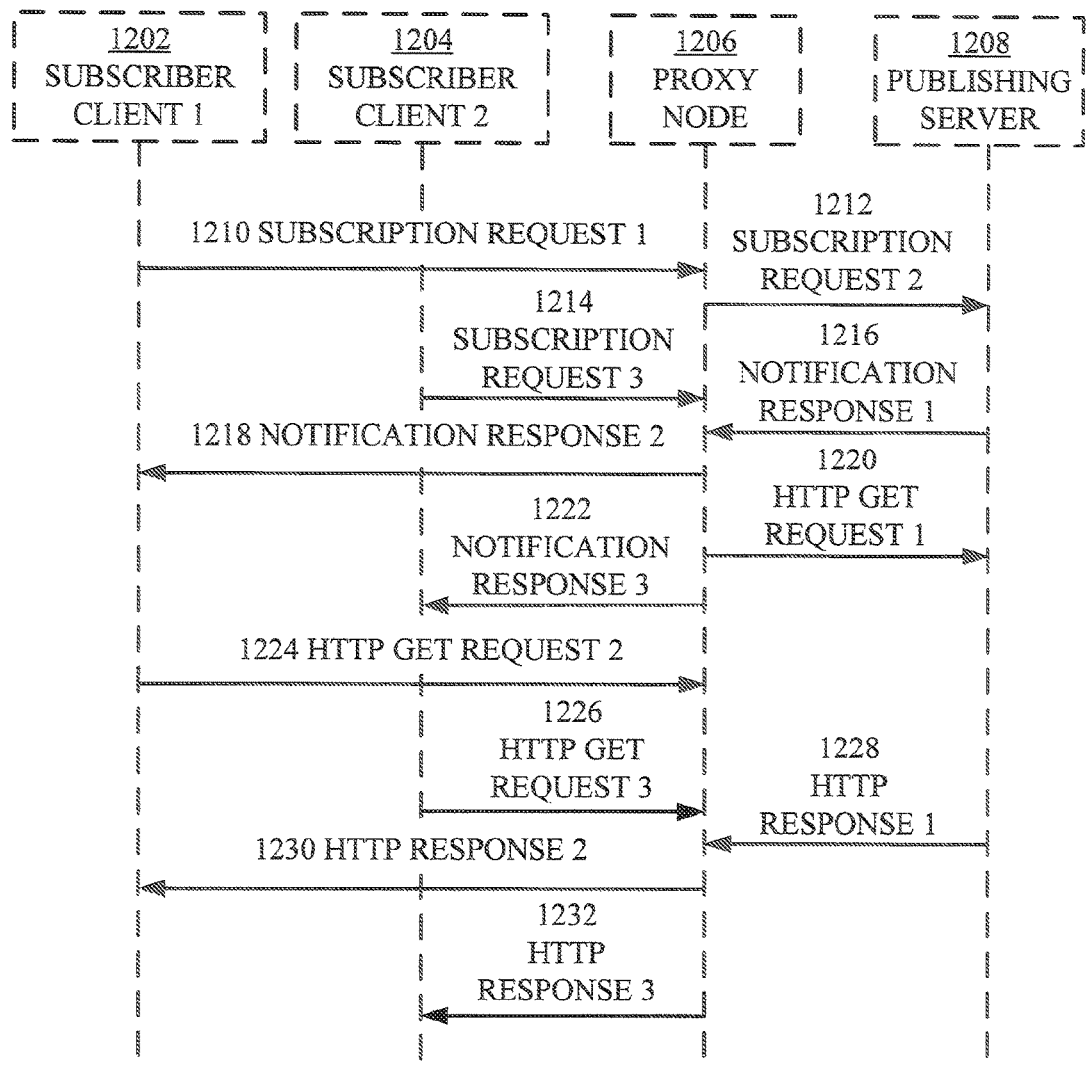
FIG. 12 illustrates aggregation and de-aggregation of signalling according to embodiments of the disclosure.

FIG. 12 illustrates aggregation and de-aggregation of connectionless communication involving subscriber client 1, 1202, subscriber client 2, 1204, proxy node 1206 and publishing server 1208, according to embodiments of the present disclosure. FIG. 12 shows how HTTP over TCP is used for transfer of high data volumes in case of request aggregation or publish-subscribe.

FIG. 12 also shows the case with aggregation of subscription request messages and de-aggregation of notification response messages, according to the use case of FIG. 11. FIG. 12 also applies to the case with request aggregation of regular request messages, and de-aggregation of the response messages according to the use case of FIG. 10.

To allow for reliable data transfer, it is not sufficient to use HTTP over TCP/IP. The notification messages are preferably also forwarded in a reliable fashion. The CoAP observation framework is an example where message can be forwarded in a reliable fashion, where an acknowledgement and retransmission mechanism is used for reliable transfer of notifications.

FIG. 12 illustrates a scenario involving a subscriber client 1, 1202 sending a subscription request 1, 1210 to the publishing server 1208. This subscription request is intercepted by the proxy node 1206. The request-response signalling based on non-transparent intercepting proxies for a connectionless protocol such as CoAP or NetInf over UDP/IP works as described above, both for the request aggregation and publish-subscribe use cases. This signalling is indicated by the Subscription Request 1, 2, 3 and Notification Response 1, 2, 3 signals in FIG. 12.

Accordingly, the proxy node 1206 sends a subscription request 2, 1212 to the publishing server 1208. It is also illustrated that subscriber client 2, 1204 sends 1214 a subscription request 3, to the publishing server 1208. This subscription request 3 is however intercepted by the proxy node 1206. The publishing server 1208, responds to the subscription request 2 by sending a notification response 1, 1216 to the proxy node 1206. The proxy node 1206 then sends 1218 a notification response back to the subscriber client 1, 1202. As a result of having received the notification response 1, 1216 the proxy node 1206 sends 1220 a HTTP GET request 1, to the publishing server 1208. The proxy node 1206 also sends 1222 a notification response back to the subscriber client 2, 1204. As a result of received notification responses the subscriber clients 1 and 2 send HTTP GET request 2, 1224 and 3, 1226, respectively. The publishing server 1208 may then send 1228 a HTTP response 1, to the proxy node 1206, which forwards this response as HTTP response 2 and 3, to subscriber clients 1 and 2, in 1230 and 1232, respectively.

In addition, each node that receives a notification response message indicating that a data object is available for retrieval from an address at a specific neighbour node, can send an HTTP GET request message to that neighbour node to retrieve the data object, as illustrated with Notification response 1, 1216 and HTTP GET Request 1, 1220 as shown in FIG. 12.

The connection-oriented signals, for example HTTP over TCP/IP, thus address the proxy node having the data object explicitly, which means that for this type of signalling it acts as a traditional non-transparent proxy.

It is noted that the exact time relation between the signals shown in FIG. 12 may vary depending on the transfer and processing latencies in different entities in the network having the proxy and server nodes. Embodiments of the present disclosure are however robust against such variations.

For example, HTTP Response 1, 1228 may arrive at Intercepting Proxy 1206 before or after HTTP GET Request 2, 1224 or 3, 1226. FIG. 12 illustrates the latter alternative. In this case the Intercepting Proxy 1206 stores HTTP GET Request 2, 1224 and/or 3, 1226 until the requested data object is received in HTTP Response 1, 1228. The Intercepting proxy 1206 then returns the requested data object in a HTTP Response 1230, 1232 message to the client nodes.

However, embodiments of the present disclosure are also applicable to the former alternative. In this case, the Intercepting Proxy 1206 caches the data object received in HTTP Response 1, 1228 and later on when receiving HTTP GET Request 2, 1224 and/or 3, 1226 returns this data object in a HTTP Response 1230, 1232 message to the client nodes 1202, 1204.

A request message originating in one edge network and destined to a server node in another edge network should traverse one or several proxy nodes to ensure that the publish-subscribe or request aggregation services of these proxy nodes can be utilized. This can be accomplished by replacing current edge routers with edge proxy nodes according to the present disclosure, since all traffic to and from an edge network must traverse these edge proxy nodes.

Moreover, an edge network can have several edge proxy nodes, and perform load sharing between them. Since the return path is identical to the forward path, a request and an associated response will always be processed by the same edge proxy node. This is a condition for a correct operation of the publish-subscribe and the request aggregation mechanism when using proxy nodes. This condition can be ensured by the inventive signalling mechanism as described above.

Note that with transparent proxies based on existing technology, there is no guarantee that this condition is fulfilled due to the possibility of asymmetric routing in the global Internet.

Consider a scenario in which a client node discovers a cached data object by sending request messages along several different paths to maximize the probability that the data object is discovered in any of the caches in the proxy nodes along the different paths. Using existing types of proxy nodes which are optimized for connection-oriented protocols, for example TCP, for this scenario would incur substantial overhead in terms of connection set-up signalling between all the proxy nodes.

Instead, this scenario can be handled more efficiently by using intercepting non-transparent proxy nodes according to the present disclosure. These proxy nodes are optimized for a connectionless protocol, for example CoAP or NetInf over UDP/IP, which incurs less overhead in terms of connection set-up signalling.

The disclosure can moreover also be based on legacy routing protocols and does not require a new routing protocol, as opposed to existing solutions. Existing information centric networking (ICN) solutions, for example content centric networking (CCN), are based on novel information-centric global routing protocols which perform routing based on the names of the information objects. The introduction of such novel routing protocols on a global scale is a major migration hurdle since this requires many years of standardization followed by major investments in new network nodes.

Moreover, to allow for globally scalable routing on the names of the information objects, these names must include topological information. This is an unattractive characteristic, since this means that the information object names would have to become location-dependent and be changed when an information object is moved to a new location in the network.

By contrast, the present disclosure supports location-independent names of data objects. In addition, the current disclosure scales to a very large number of publisher nodes and client nodes in a global network, as opposed to the only existing alternative in networks of today, which is IP multicast.

In summary, this disclosure can be used to support the use case of point-to-multipoint distribution of data by means of a hierarchical network of publish-subscribe, or request aggregation, or caching nodes as illustrated in FIGS. 10-12.

It is further noted that the above described embodiments are only given as examples and should not be limiting to the present disclosure, since other solutions, uses, objectives, and functions can be apparent from this disclosure.

Presented inventive features may be combined and/or applied to the use cases and applications as herein disclosed.

As mentioned in the background section, there are several problems associated with applying the transparent, semi-transparent and non-transparent types of proxy nodes to these use case.

Drawbacks of current types of proxy nodes are summarized in the table shown in FIG. 13. This table also allows for a comparison with the characteristics of the present disclosure based on the inventive type of intercepting non-transparent proxy.

An example of the application layer header mentioned in the table of FIG. 13 is the HTTP Via header, which can record the names of the traversed proxy nodes. When source address spoofing is used, a receiving node may use this application layer information to determine the correct source address. However, using application layer information to rectify a spoofed source address is a layer violation in the sense that upper layers are used to solve addressing shortcomings at lower layers, which is a clear disadvantage.

Applying the non-transparent intercepting proxy approach of the present disclosure to HTTP over TCP/IP would imply that the above mentioned new protocol field would have to be implemented in the legacy TCP protocol. This is an unattractive proposal from a migration point of view, since the TCP protocol is implemented in the operating systems of networked hosts, which are not easily changed.

The non-transparent intercepting proxy approach according to the present disclosure is accordingly optimized for connectionless signalling.

Embodiments of the present disclosure carry the following additional advantages:

The disclosure allows for better security as opposed to transparent and semi-transparent proxy nodes, since the disclosure does not use spoofed source addresses. Client nodes may be interacting with proxy nodes using spoofed sourced addresses without being aware of this, which opens up for security attacks. In addition, for the transparent proxy, not only the client but also the server may be interacting with this type of proxy without being aware of this. Even though proxy nodes should indicate their presence in the path by using the HTTP Via header, a hostile proxy node or a proxy node behind a firewall cannot be expected to indicate its presence in the path.

Moreover, CoAP does not have a protocol field corresponding to the HTTP Via header.

Abbreviations

API application programming interface
CCN content centric network
CoAP constrained application protocol
HTTP hypertext transfer protocol
ICN information centric network
IP Internet protocol
SLA service layer agreement
TCP transmission control protocol
UDP user datagram protocol
URL uniform resource location

The invention claimed is:

1. A method in a proxy node for non-transparent interception, the method comprising:
receiving from a first node a primary request comprising an address of the first node as a source address, an address of a server node as a destination address, and a first token as an identifier of the primary request;
storing the primary request;
creating a secondary request based on the primary request, the secondary request comprising an address of the proxy node as a source address, the address of the server node as a destination address, and a second token as an identifier of the secondary request, wherein the secondary request is associated with the primary request;
storing the secondary request;
sending the secondary request to a second node;
receiving a secondary response from the second node, said secondary response comprising an address of the second node as a source address, the address of the proxy node as a destination address, and the second token as an identifier of the secondary response;
locating the stored secondary request based on the second token utilized with the secondary request and the secondary response;
locating the stored primary request based on association with the stored secondary request;
creating a primary response based on the primary request and the secondary response, said primary response comprising the address of the proxy node as a source address, the address of the first node as a destination address, and the first token as an identifier of the primary response; and
sending to said first node said primary response.

2. The method according to claim 1, wherein the receiving the secondary response includes receiving an object and caching the object in the proxy node as an object requested in the primary request.

3. The method according to claim 2, further comprising subsequently receiving from the first node another primary request requesting said object and when said object is cached in the proxy node, creating another primary response based on said another primary request, wherein said primary response comprising the said object, and sending said another primary response to the first node.

4. The method according to claim 1, wherein the receiving from the first node the primary request comprises intercepting the primary request as sent from the first node.

5. The method according to claim 1, wherein when receiving the secondary response, the secondary response comprising a secondary field instructing the proxy node to accept said secondary response having a source address of the second node, which is different from the server node that was the destination address of the secondary request and further creating the primary response comprising a primary field for instructing the first node to accept said primary response having a source address of the proxy node, which is different from the server node that was the destination address of the primary request.

6. The method according to claim 5, wherein the primary and secondary fields comprise the address of the server node.

7. A proxy node for a communication network, the proxy node comprising:
a processor; and
a non-transitory memory storing computer program code which when run on the processor, causes the proxy node to:
receive from a first node a primary request comprising an address of the first node as a source address, an address of a server node as a destination address, and first token as an identifier of the primary request;
store the primary request;
create a secondary request based on the primary request, the secondary request comprising an address of the proxy node as a source address, the address of the server node as a destination address, and a second token as an identifier of the secondary request, wherein the secondary request is associated with the primary request;

store the secondary request;

send the secondary request to a second node;

receive a secondary response from the second node, said secondary response comprising an address of the second node as a source address, the address of the proxy node as a destination address, and the second token as an identifier of the secondary response;

locate the stored secondary request based on the second token utilized with the secondary request and the secondary response;

locate the stored primary request based on association with the stored secondary request;

create a primary response based on the primary request and the secondary response, said primary response comprising the address of the proxy node as a source address, the address of the first node as a destination address, and the first token as an identifier of the primary response; and send to said first node said primary response.

8. The proxy node according to claim 7, wherein the computer program code which when run on the processor, further causes the proxy node to receive the secondary response comprising an object and caching the object as an object requested in the primary request.

9. The proxy node according to claim 8, wherein the computer program code which when run in the processor, further causes the proxy node to subsequently receive from the first node another primary request requesting said object and when said object is cached in the proxy node, create another primary response based on said another primary request, wherein said primary response comprising the said object, and send said another primary response to the first node.

10. The proxy node according to claim 7, wherein the computer program code which when run on the processor, further causes the proxy node to intercept the primary request as sent from the first node.

11. The proxy node according to claim 7, wherein the computer program code which when run on the processor, further causes the proxy node to receive the secondary response comprising a secondary field instructing the proxy node to accept said secondary response having a source address of the second node, which is different from the server node that was the destination address of the secondary request and to further create the primary response comprising a primary field for instructing the first node to accept said primary response having a source address of the proxy node, which is different from the server node that was the destination address of the primary request.

12. The proxy node according to claim 11, wherein the primary and secondary fields comprise the address of the server node.

13. A proxy node for a communication network, the proxy node comprising:
   a transmitter,
   a receiver and
   a processing circuitry that is adapted to:
      receive via the receiver from a first node a primary request comprising an address of the first node as a source address, an address of a server node as a destination address, and a first token as an identifier of the primary request;

store the primary request;

create a secondary request based on the primary request, the secondary request comprising an address of the proxy node as a source address, the address of the server node as a destination address, and a second token as an identifier of the secondary request, wherein the secondary request is associated with the primary request;

store the secondary request;

transmit via the transmitter the secondary request to a second node;

receive via the receiver a secondary response from the second node, said secondary response comprising an address of the second node as a source address, the address of the proxy node as a destination address, and the second token as an identifier of the secondary response;

locate the stored secondary request based on the second token utilized with the secondary request and the secondary response;

locate the stored primary request based on association with the stored secondary request;

create a primary response based on the primary request and the secondary response, said primary response comprising the address of the proxy node as a source address, the address of the first node as a destination address, and the first token as an identifier of the primary response; and transmit via the transmitter said primary response to said first node.

14. A method in a client node, the method comprising:
sending, to a proxy node, a primary request comprising an address of the client node as a source address, an address of a server node as a destination address, and a first token as an identifier of the primary request, wherein the primary request to cause the proxy node to store the primary request, create a secondary request based on the primary request, the secondary request comprising an address of the proxy node as a source address, the address of the server node as a destination address, and a second token as an identifier of the secondary request, in which the secondary request is associated with the primary request, and wherein the proxy node to store the secondary request and send the secondary request to a second node;

receiving from the proxy node a primary response comprising an address of the proxy node as a source address, the address of the client node as a destination address, the first token as an identifier of the primary response, and a field instructing the client node to accept the primary response having a source address which is different from the server node that was the destination address of the primary request, wherein the proxy node, in response to sending the secondary request to the second node, is to receive a secondary response from the second node, the secondary response comprising an address of the second node as a source address, the address of the proxy node as a destination address, and the second token as an identifier of the secondary response, the proxy node to further locate the stored secondary request based on the second token utilized with the secondary request and the secondary response, and to locate the stored primary request based on association with the stored secondary request, and wherein the proxy node to create the primary response based on the primary request and the secondary response; and associating the primary request to the primary response based on the first token received with the primary response to accept the primary response as a reply to the primary request.

15. The method according to claim 14, wherein the field comprises the address of the server node.

16. A client node for a communication network, the client node comprising:

a processor; and a non-transitory memory storing computer program code which when run on the processor, causes the client node to:

transmit, to a proxy node, a primary request comprising an address of the client node as source address, an address of a server node as a destination address, and a first token as an identifier of the primary request, wherein the primary request to cause the proxy node to store the primary request, create a secondary request based on the primary request, the secondary request comprising an address of the proxy node as a source address, the address of the server node as a destination address, and a second token as an identifier of the secondary request, in which the secondary request is associated with the primary request, and wherein the proxy node to store the secondary request and send the secondary request to a second node;

receive, from the proxy node, a primary response comprising an address of the proxy node as a source address, the address of the client node as a destination address, the first token as an identifier of the primary response, and a field instructing the client node to accept the primary response having a source address which is different from the server node that was the destination address of the primary request, wherein the proxy node, in response to sending the secondary request to the second node, to receive a secondary response from the second node, the secondary response comprising an address of the second node as a source address, the address of the proxy node as a destination address, and the second token as an identifier of the secondary response, the proxy node to further locate the stored secondary request based on the second token utilized with the secondary request and the secondary response, and to locate the stored primary request based on association with the stored secondary request, and wherein the proxy node to create the primary response based on the primary request and the secondary response; and associate the primary request to the primary response based on the first token received with the primary response to accept the primary response as a reply to the primary request.

17. The client node according to claim 16, wherein the field comprises the address of the server node.

18. A client node for a communication network, the client node comprising:

a receiver;

a transmitter; and a processing circuitry that is adapted to:

transmit via the transmitter, to a proxy node, a primary request comprising an address of the client node as a source address, an address of a server node as a destination address, and a first token as an identifier of the primary request, wherein the primary request to cause the proxy node to store the primary request, create a secondary request based on the primary request, the secondary request comprising an address of the proxy node as a source address, the address of the server node as a destination address, and a second token as an identifier of the secondary request, in which the secondary request is associated with the primary request, and wherein the proxy node to store the secondary request and send the secondary request to a second node;

receive via the receiver, from the proxy node, a primary response comprising an address of the proxy node as a source address, the address of the client node as a destination address, the first token as an identifier of the primary response, and a field instructing the client node to accept the primary response having a source address which is different from the server node that was the destination address of the primary request, wherein the proxy node, in response to sending the secondary request to the second node, to receive a secondary response from the second node, the secondary response comprising an address of the second node as a source address, the address of the proxy node as a destination address, and the second token as an identifier of the secondary response, the proxy node to further locate the stored secondary request based on the second token utilized with the secondary request and the secondary response, and to locate the stored primary request based on association with the stored secondary request and wherein the proxy node to create the primary response based on the primary request and the secondary response; and associate the primary request to the primary response based on the first token received with the primary response to accept the primary response as a reply to the primary request.

* * * * *